United States Patent [19]

Moser et al.

[11] 4,352,455
[45] Oct. 5, 1982

[54] ARRANGEMENT FOR HEATING THE SERVICE CABIN OF A MACHINE DRIVEN BY AN INTERNAL COMBUSTION ENGINE

[75] Inventors: Gottfried Moser, Gladbach; Hansjürgen Gross, Niederkassel, both of Fed. Rep. of Germany

[73] Assignee: Klockner-Humboldt-Deutz AG, Cologne, Fed. Rep. of Germany

[21] Appl. No.: 123,169

[22] Filed: Feb. 20, 1980

[30] Foreign Application Priority Data

Aug. 10, 1979 [DE] Fed. Rep. of Germany ....... 2932448

[51] Int. Cl.³ .............................................. B60H 1/14
[52] U.S. Cl. ............................... 237/12.3 R; 126/247; 122/26; 184/104 B; 123/196 AB
[58] Field of Search ...................... 237/12.3 A, 12.3 B, 237/12.3 C, 1 R, 12.3 R; 123/196 AB, 142.5 R; 126/247; 184/104 B, 104 A

[56] References Cited

U.S. PATENT DOCUMENTS

| 4,136,824 | 1/1979 | Kallenbach | 237/12.3 R |
| 4,249,491 | 2/1981 | Stein | 123/196 AB |

FOREIGN PATENT DOCUMENTS

| 2628697 | 1/1977 | Fed. Rep. of Germany | 122/26 |
| 2623621 | 4/1978 | Fed. Rep. of Germany | 123/196 AB |

*Primary Examiner*—Albert J. Makay
*Attorney, Agent, or Firm*—Watson, Cole, Grindle & Watson

[57] ABSTRACT

An arrangement for heating the service cabin of a machine driven by an internal combustion engine, includes a hydraulic pump which is driven by the engine and which pumps oil from the engine's oil reservoir and through an operating element, as for example a throttle, located between the hydraulic pump and the heat exchanger. The heat produced in the operating element and in the hydraulic pump effects an increase in temperature of the oil before reaching a heat exchanger, located in the service cabin, through which the heated oil is returned to the oil reservoir. The pumped oil may be selectively valved directly back into the oil reservoir for quickly heating the oil of the engine, and the hydraulic pump may be arranged for the taking of oil from the pressurized oil lines of the engine's lubricating oil distribution system rather than directly from the oil reservoir. The oil may bypass the heat exchanger through a pressure release valve so that the volume of oil heated by the operating element and by the hydraulic pump may be regulated to thereby regulate the temperature of the heat exchanger. Moreover, if the oil is sufficiently heated by the engine and by the hydraulic pump, it may be made to bypass the operating element by selective valving and, valving which is provided for returning the pumped oil directly to the oil reservoir and for bypassing the operating element may be thermostatically connected to either the oil reservoir or to the heat exchanger for controlling operation of the valves depending on the change in temperature of the oil at the oil reservoir or at the heat exchanger.

9 Claims, 4 Drawing Figures

ARRANGEMENT FOR HEATING THE SERVICE CABIN OF A MACHINE DRIVEN BY AN INTERNAL COMBUSTION ENGINE

RELATED APPLICATIONS

This application relates to U.S. Ser. No. 123,944, filed Feb. 25, 1980, and to U.S. Ser. No. 165,083 filed July 1, 1980, both commonly owned herewith.

BACKGROUND OF THE INVENTION

This invention relates generally to an arrangement for heating the service cabin of a machine driven by an internal combustion engine, especially the occupant's cabin of a motor vehicle, whereby heated oil of the engine is fed to a heat exchanger located in the service cabin and is returned to the oil circulation system of the engine.

German Pat. No. 26 23 621 generally discloses such an arrangement for an air-cooled internal combustion engine, although this heating arrangement is inadequate for effectively heating the service cabin under such conditions as during low outside temperatures and during operation of the internal combustion engine under a low output.

Even the heating arrangements provided for liquid-cooled internal combustion engines wherein heat exchangers are used through which the liquid coolant of the engine flows for heating the service cabin, are lacking in providing adequate heat for the occupant's cabin in a quick and efficient manner. This is especially true whenever the internal combustion engine operates at a low output for an extended period of time, or whenever it becomes necessary to heat the liquid coolant of the engine when it has become cold after a prolonged standstill before it can discharge heat. As a result, for example, it becomes difficult to quickly defrost the windshield or other windows of the occupant's cabin.

SUMMARY OF THE INVENTION

It is therefore an object of the present invention to provide an arrangement for heating the occupant's cabin of such a machine driven by an internal combustion engine in such a manner as to yield sufficient heat output quickly, simply, efficiently and independently of the load and operating temperature of the internal combustion engine. Moreover, the present arrangement is capable of quickly heating the engine by raising the temperature of the lubricating oil.

The arrangement according to the invention includes the provision of a hydraulic pump which is driven by the internal combustion engine and which pumps oil from the oil tank, the oil collecting container or some other similar part of the engine, the oil being pumped through an operating element, such as a throttle, which is connected at the pressure side of the hydraulic pump and to the inlet side of the heat exchanger which is located in the occupant's cabin. Such hydraulic pump may comprise any ordinary pump which is used for operating hydraulic systems in machines and vehicles, which is capable of a relatively low delivery volume and a high delivery pressure of about 150 bar, and which is driven directly or with the interposition of a mechanically shiftable coupling from the internal combustion engine. The pressure produced by the hydraulic pump is reduced in the operating element, so that the heat produced in the hydraulic pump and in the operating element raises the temperature of the lubrication oil which may be fed either through the heat exchanger to thereby quickly heat the occupant's cabin or which may be fed directly back into the engine's distribution system for quickly achieving the required temperature of the lubricating oil. The operating element may be comprised of a simple and rigid throttle or may be in the form of an adjustable throttle which, for example, is thermostatically adjustable for yielding a constant oil temperature so that the throttle, after reaching the desired temperature, may be opened to such an extent as to relieve the hydraulic pump of additional significant work.

The hydraulic pump may be continuously driven, and the arrangement may include a two-way valve located between the pump and the operating element with a direct return leading from the valve to the oil reservoir. This two-way valve may thus serve to selectively switch the heating arrangement on and off, so that in one terminal position, the oil returns without pressure to the oil reservoir, while in the other terminal position the oil passes from the hydraulic pump, through the operating element and through the heat exchanger for heating the occupant's cabin.

Since the lubricating oil of the engine may become fouled so badly as to cause damage to the hydraulic pump, an oil filter may be series-connected between the hydraulic pump and the oil supply from which the oil is pumped. And, the hydraulic pump may alternatively be coupled into the pressurized oil lines of the internal combustion engine at the pressure side of the engine oil pump normally provided for the lubricating oil distribution system. In such an arrangement, an additional oil filter or the existing filter for the engine oil may be utilized for purifying the oil. Such an arrangement may thus be employed if it becomes impractical from a space or engineering requirement to suction oil directly from the oil reservoir by the hydraulic pump, in which case the pressure of the existing motor oil pump is used as an inlet pressure to the hydraulic pump.

The heating arrangement according to the invention may also include a regulating valve located between the operating element and the heat exchanger, with a bypass line having an excess pressure or pressure relief valve for bypassing the regulating valve and the heat exchanger. The quantity of oil flowing through the heat exchanger may thus be regulated so that the present heating arrangement may be controlled not only via the air volume which flows through the heat exchanger, but also via the temperature of the heat exchanger itself.

In a further development of the invention, a bypass line may be provided for bypassing the operating element, the flow through the operating element or through the bypass line being selectively controlled by a two-way valve. This valve may be controlled either manually or thermostatically, in the latter case of which the control may be accomplished either by the temperature of the oil in the vicinity of the heat exchanger or by the temperature of the oil in the vicinity of the oil reservoir. With such an arrangement, an operating element may be provided which operates at a fixedly adjusted throttle without any separate thermostatic adjustment. Furthermore, when the temperature of the lubricating oil is sufficiently high, it may be fed directly to the heat exchanger so that the operating performance of the hydraulic pump is omitted. As a result, a cooling of the lubricating oil will take place simultaneously since the heat exchanger of the heating system will operate as an oil cooler. Therefore, with such a switching arrangement, the operating element is used only in the sense of a pure additional heating mechanism. It should be pointed out that the operating element may be other than a throttle so long as the lubricating oil is heated by such element in connection with the hydraulic pump.

The heating arrangement according to the invention may be used with either an air-cooled or a water-cooled internal combustion engine, and may serve for both heating the occupant's cabin as well as for the quick heating of the lubricating oil of the engine.

Other objects, advantages and novel features of the invention will become more apparent from the following detailed description of the invention when taken in conjunction with the accompanying drawings.

DETAILED DESCRIPTION OF THE INVENTION

Figure 1:
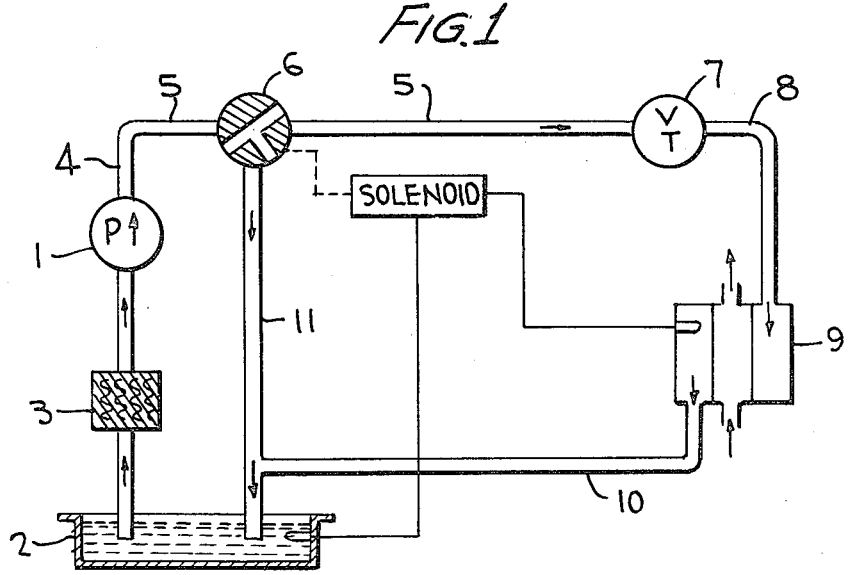
FIG. 1 diagramatically illustrates the heating arrangement according to the invention.

In the drawings, only those elements are shown which are needed to illustrate the arrangement and operation according to the invention, other elements therefore being omitted for the sake of clarity. A hydraulic pump 1 is shown in FIG. 1 which may be of a type producing a high pressure about 150 bar at a relatively low volume of about 10 to 20 cm$^3$/min. The hydraulic pump suctions oil from a lubricating oil reservoir 2 or from a similar oil supply of an internal combustion engine (not shown). The oil may be pumped directly from reservoir 2, or as shown in FIG. 1 the oil may be pumped from reservoir 2 with the interposition of an oil filter 3 which may be coupled into the oil conduit between the pump and the reservoir to avoid any damage to the hydraulic pump in the event the lubricating oil becomes fouled. An operating element 7 is coupled into oil conduit 5 at the pressure side 4 of the hydraulic pump, and a two-way valve 6 is coupled into oil conduit 5 between the hydraulic pump and the operating element. As described earlier, operating element 7 may be in the form of a throttle which functions in connection with the hydraulic pump to heat up the pumped oil of the internal combustion engine. A heat exchanger 9 is coupled into oil conduit 5 at the discharge side 8 of the operating element, the heat exchanger being located as in any normal manner in the service cabin (not shown) of a machine driven by an internal combustion engine, or in the occupant's cabin (also not shown) of a motor vehicle. The oil fed through the heat exchanger returns to oil reservoir 2 via a conduit 10 which, as shown in FIGS. 1 and 3, intersects with a return conduit 11 leading from the two-way valve 6.

Figure 2:
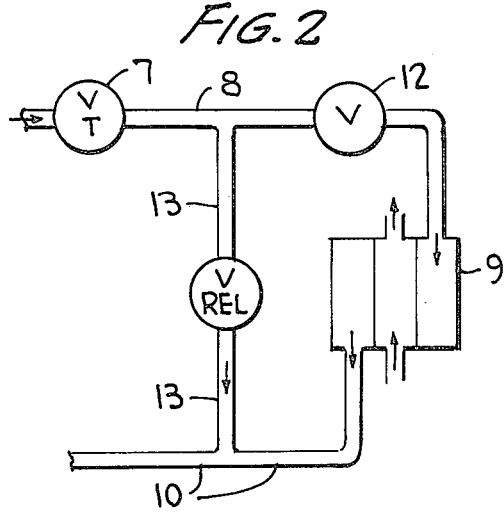
FIG. 2 is a diagramatic illustration of a modification of the FIG. 1 arrangement showing a regulating valve and bypass line for bypassing the heat exchanger.

FIG. 2 shows a slight modification of the FIG. 1 arrangement and is identical other than that shown. Here, a regulating valve 12 is coupled into the oil conduit at the inlet side of heat exchanger 9, and a bypass conduit 13 is provided parallel to both, the conduit 13 containing an excess pressure or pressure relief valve 14. With such an arrangement, it is possible to regulate the oil volume heated by the hydraulic pump and by the operating element flowing through the heat exchanger so that the temperature of the heat exchanger may also be regulated as this oil volume bypasses the heat exchanger.

With the heating arrangement thus far described, the pressure produced by the hydraulic pump is reduced in the operating element so that the heat produced in the hydraulic pump and in the operating element causes an increase in temperature of the oil which may be fed into the heat exchanger via valve 6 as in FIG. 1 for thereby heating the occupant's cabin, or which may bypass the heat exchanger as in FIG. 2 for quickly heating the oil of the internal combustion engine and thus quickly achieving the required temperature of the operating oil as it is returned to the oil reservoir. The heating arrangement according to FIG. 2 may thus be controlled not only by means of the air volume which flows through the heat exchanger but also by means of the heat exchanger temperature as the heated oil is made to bypass the heat exchanger. And, as described earlier, the hydraulic pump may be continuously driven by the internal combustion engine and the heating arrangement may be switched off by the operation of valve 6 so as to cause the oil to return without pressure into reservoir 2 via return conduit 11.

Figure 3:
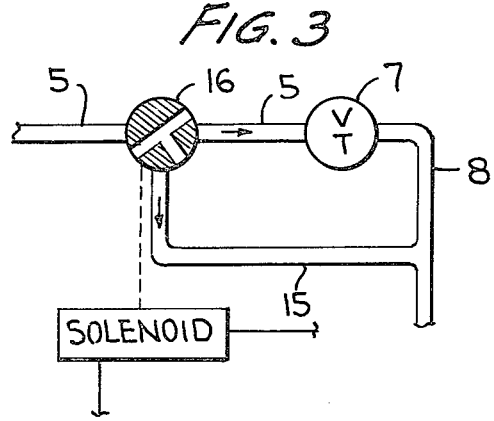
FIG. 3 is a view similar to FIG. 1 except that a line is shown bypassing the operating element and controlled by a two-way valve.

The heating arrangement according to FIG. 3 is the same as that of FIG. 1 except that a bypass conduit 15 leading from valve 16 is provided in parallel to operating element 7 so that the oil may reach the heat exchanger without passing through the operating element, which is desirable whenever the oil of the internal combustion engine has been sufficiently heated by the engine. Thus, in FIG. 3, operating element 7 serves for the additional loading and heating of the oil circulation and may be selectively switched on or off by valve 16. This valve, as well as valve 6, may be controlled either manually or thermostatically by a thermostatic interconnection shown in FIGS. 1 and 3 as including solenoids for operating the valves and being connected with the surroundings of the oil reservoir or with the surroundings of the heat exchanger so that the operation of either or both valves depends on the temperature in the oil reservoir or on the temperature of the oil in the vicinity of the heat exchanger.

Figure 4:
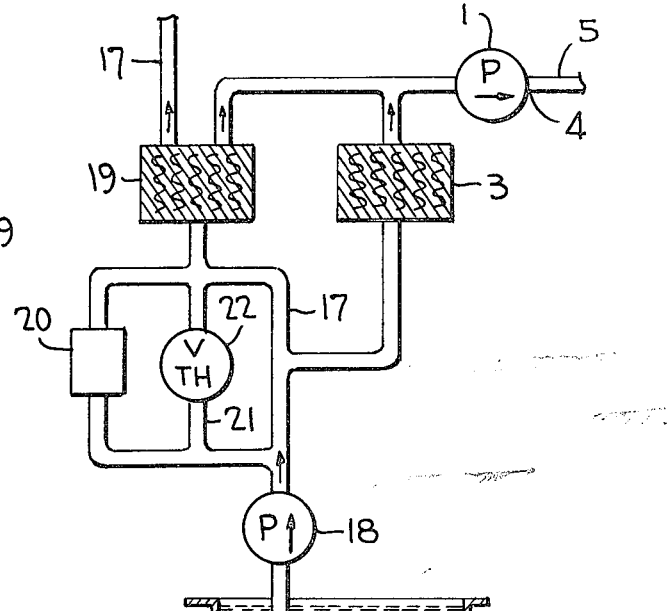
FIG. 4 is a diagramatic illustration of another modification according to the invention wherein the hydraulic pump is coupled into the existing pressurized oil lines of the internal combustion engine.

In the heating arrangement described above with reference to FIGS. 1 to 3, the lubricating oil is pumped from the oil reservoir and through an oil conduit system which is provided independently of and in addition to the existing oil distribution system normally provided for the internal combustion engine. On the other hand, the heating arrangement according to the invention shown in FIG. 4 is connected into the existing oil distribution system of the engine. Thus, hydraulic pump 1 is coupled into the existing pressurized oil lines 17 through an oil filter 19 present in the engine for the filtration of oil pumped from reservoir 2 by a pump 18 provided as a part of the oil distribution system for the engine. The suction side of pump 1 is coupled into pressurized oil lines 17 at the pressure side of pump 18. And, if desired, the hydraulic pump may be provided with its own oil filter 3 in which case the hydraulic pump bypasses oil filter 19, as shown in FIG. 4. An oil cooler 20 and a parallel bypass conduit 21, controlled thermostatically by valve 22, may be provided in any normal manner, the oil cooler and bypass line being located between pump 18 and filter 19 as shown. The heating arrangement of FIGS. 1, 2 and/or 3 continues beyond conduit 5 shown broken away in FIG. 4 but is not otherwise shown in this Figure for the sake of clarity. Also, it should be pointed out that, according to the invention, heat exchanger 9 may function as an oil cooler when, as shown in FIG. 3, the oil bypassing operating element 9 is fed to this cooler. With such an arrangement, the heated air leaving the heat exchanger may be discharged to the exterior of the occupant's cabin.

As in the FIG. 4 arrangement, it is possible to connect the heating arrangement according to the invention in a simple manner to any type motor since the pressurized oil lines or the oil filter for the motor are typically accessible from the outside without requiring any reconstruction or finishing of the internal combustion engine.

According to the invention, hydraulic pump 1, oil conduit 5, valves 6 and 16, operating element 17 as well as discharge line 8 up to the heat exchanger may be insulated so that the full volume of heat will be available to the heat exchanger. And, pump 18 for the lubricating oil and hydraulic pump 1 possibly together with its oil filter 3 may be combined into one constructional unit according to the invention. This may be effected by a series-type construction or by a parallel connection. Also, it is possible to provide only a single pump in which case the pressure for the lubricating oil of the internal combustion engine may be reduced. And, the single construction unit referred to above could be housed with the oil reservoir or with some similar oil supply.

Obviously, many modifications and variations of the present invention are made possible in the light of the above teachings. It is therefore to be understood that within the scope of the appended claims, the invention may be practiced otherwise than as specifically described.

What is claimed is:

1. An arrangement for heating the operator's cabin of a motor vehicle powered by an internal combustion engine, comprising a lubricating system including a first lubricating oil pump operating at a predetermined lubricant pressure level for pumping oil from the engine oil sump into pressurized oil lines of the engine, a heating system including a second lubricating oil pump having a suction conduit connected to the engine oil sump, a supply conduit leading from the discharge side of the second pump to a heat exchanger provided for supplying heat to the operator's cabin, and a first return conduit leading from said heat exchanger to the oil sump, the improvement wherein an operating element is coupled into said supply conduit for reducing the pressure and elevating the temperature of the lubricating oil passing therethrough, and said second pump having a capacity to produce a pressure of about one order of magnitude higher than said predetermined pressure level of said first pump, whereby the heat produced by said second pump and by said operating element raises the temperature of the lubricating oil fed through said heat exchanger to thereby increase the heating efficiency of said heat exchanger.

2. The arrangement according to claim 1, wherein said second lubricating oil pump is arranged to be continuously driven by said internal combustion engine, a first two-way valve being coupled into said supply conduit between said second pump and said operating element, a second return conduit leading from said valve to the sump and intersecting said first return conduit, whereby the oil may be returned without pressure directly to the sump.

3. The arrangement according to claim 1 or 2, wherein an oil filter is coupled into said suction conduit between said second pump and the sump.

4. The arrangement according to claim 1 or 2, wherein the second pump is connected into the lubricating system, said suction conduit of said second pump being coupled into said oil lines of said lubricating system.

5. The arrangement according to claim 4, wherein a lubricating oil filter is coupled into said oil lines at the pressure side of said first lubricating oil pump, said second pump being coupled into said lines at the discharge side of said filter.

6. The arrangement according to claim 1 or 2, wherein a regulating valve is coupled into said supply conduit between said operating element and said heat exchanger, and a bypass conduit spanning said heat exchanger for bypassing said heat exchanger upon closing said regulating valve, said bypass conduit having an excess pressure valve coupled therein, whereby the volume of oil heated by said operating element and said second pump may be regulated to thereby regulate the temperature of said heat exchanger.

7. The arrangement according to claim 1 or 2, wherein a second two-way valve is coupled into said supply conduit between said first valve and said operating element, a bypass conduit extending from said second valve and connecting at the inlet side of said heat exchanger for bypassing said operating element, whereby oil which may have been sufficiently heated by the engine and by said second pump will reach said heat exchanger upon operation of said second valve wit-out passing through said operating element.

8. The arrangement according to claim 7, wherein said first and second valves are thermostatically connected to the sump, whereby operation of said valves is controlled depending on the change in temperature of the oil in the sump.

9. The arrangement according to claim 7, wherein said first and second valve are thermostatically connected to said heat exchanger, whereby operation of said valves are controlled depending on the change in temperature of the oil at said heat exchanger.

* * * * *